March 3, 1936.   C. OTTE   2,032,764

TACKLE SWIVEL

Filed Jan. 30, 1935

Inventor
Claus Otte
by
Attorney

Patented Mar. 3, 1936

2,032,764

UNITED STATES PATENT OFFICE 2,032,764

TACKLE SWIVEL

Claus Otte, Anaheim, Calif.

Application January 30, 1935, Serial No. 4,047

1 Claim. (Cl. 59—95)

This invention relates to tackles and more specifically to an assemblage of a rope or line and pulleys or blocks arranged for hoisting or pulling. Such device is commonly employed as a means for applying power and/or altering the point of application of power to an object so as to apply power thereto more advantageously.

One of the more common faults of tackles of the general type indicated lies in the tendency for twists in the line to accumulate at a certain point thereof to such an extent that free running of the line over the sheaves of the blocks is interfered with. In most tackles of this general character, the line is in the form of a rope made up of a plurality of strands twisted about each other in spiral configuration. Hence, when such a line travels over a pulley or sheave, there is a tendency for the natural twists of the strands to be carried back in the line instead of moving over the sheave. Accordingly, in that form of tackle wherein the line has a standing part, or a part which is fastened to one of the blocks so that that part is motionless with respect to the block, twists gradually accumulate in the standing part to such an extent that loops and kinks will form therein after tension upon the tackle has been relieved, and thereby interfere with subsequent free running of the line over the sheaves of the blocks.

The present invention seeks to increase the efficiency of operation of a tackle by providing means for preventing the accumulation of twists in the line. This can be accomplished with ease and without impairing the efficiency of operation of the rest of the assemblage of blocks and line by incorporating a suitable swivel into the standing part of the line, preferably immediately adjacent the block to which the standing part is attached. This swivel should be especially free running so that it offers a minimum of resistance to the untwisting of the line, and accordingly it is another object to provide a specific form of swivel which is unusually free running and hence particularly well adapted for use in the general combination wherein the swivel is incorporated with the standing part of the rope or line of a tackle.

The invention possesses other objects and features of advantage, some of which, with the foregoing, will be set forth in the following description of the preferred form of my invention which is illustrated in the drawing accompanying and forming part of the specification. It is to be understood that I do not limit myself to the showing made by the said drawing and description, as I may adopt variations of the preferred form within the scope of my invention as set forth in the claim.

Referring to the drawing.

In terms of broad inclusion, the present invention contemplates the combination with the line of a block and tackle, of suitable means for permitting twists which otherwise would tend to accumulate therein to free themselves, thereby avoiding the tendency for twists and kinks to form in the line to such extent as to interfere with free running of the line over the sheaves of the blocks.

Figure 1:
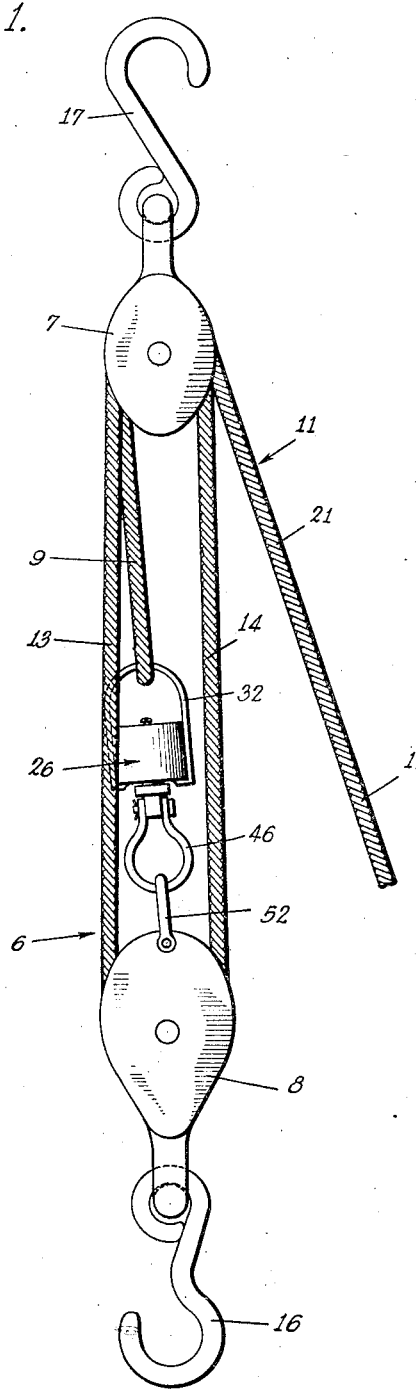
Figure 1 is a view in side elevation of a tackle into the standing part of whose line a swivel has been incorporated in accordance with the principles of the present invention.

Figure 1 shows my invention operatively associated with an otherwise conventional form of tackle 6. The type of tackle chosen for illustration is commonly known as a "luff tackle" inasmuch as it is composed of a double block 7 and a single block 8 to the latter of which a standing part 9 of the line 11 is secured, and the fall 12, or portion of the line to which the force is applied, extends from one of the sheaves of the upper or double block 7. The two blocks 7 and 8 are interconnected by the standing part 9 and two runs 13 and 14. The mechanical advantage gained by such a tackle is three, i. e., disregarding friction, three times the force applied to the fall 12 will be exerted at the bail or hook 16 with which the lower, single block 8 is provided, the distance which this bail travels, however, being only one-third of the distance travelled by a given point on the fall 12. It is to be understood, of course, that the double or upper block 7 is also provided with a suitable hook or bail 17 whereby the entire assemblage can be secured to a suitable purchase point.

It is well known that when the line of a tackle is subjected to tension and is caused to move over the sheaves of the blocks, as in performing the usual function of a tackle, the natural twists 21 of the strands will not move freely over the sheaves, but will tend to be retained as the line moves therepast, thereby causing an excess number of twists to accumulate gradually in that portion of the line which defines the runs 13 and 14 and to an even greater extent in the extreme inner portion or standing part 9. The result of such accumulation is that frequently when the load or tension upon the entire tackle is relieved, thereby removing the tension in the standing part 9, the excessive number of twists therein will cause the standing part to immediately become knotted and kinked, thereby making further use of the entire tackle inconvenient, if not altogether impossible, without breaking the connection between the standing part and the single block 8 to which it has been secured.

The present invention provides means for overcoming this natural tendency for twists to accumulate in the standing part 9. I accomplish this by incorporating a swivel indicated in its entirety at 26 into the standing part 9, the purpose of which swivel is to attach the standing part 9 to the block 8 so as to prevent movement of the standing part 9 away from the block 8 in the same manner as though the standing part were attached directly thereto, and yet to permit free rotary motion of the standing part 9 about its own longitudinal axis with respect to the block 8 so that whether the standing part is tending to twist or untwist at any time, this natural tendency of the line is not interfered with.

Figure 2:
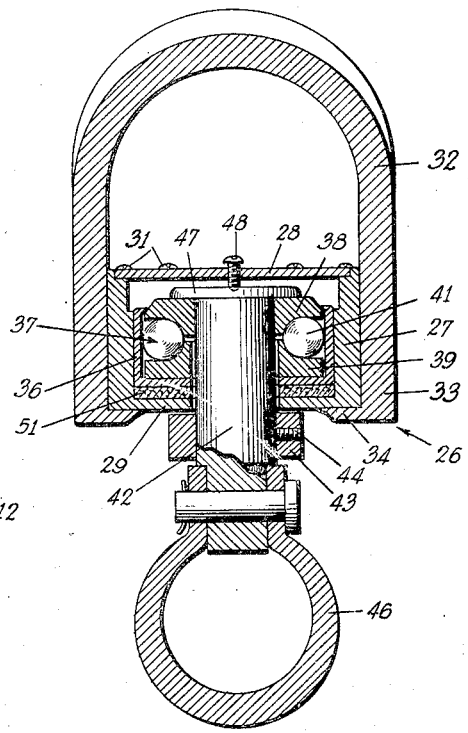
Figure 2 is an enlarged detailed view in vertical, medial section, showing the inner construction of the swivel of Figure 1.

It is desirable that the swivel 26 be of an unusually free running type for the reason that the amount of force exerted by the standing part 9 tending to cause its rotation is much less than the tension imposed upon that part of the line in the direction of its major axis. With these desiderata in view, I have designed a form of swivel which is particularly well adapted for the use contemplated by the present invention. The inner construction of a swivel having such characteristics is best shown upon Figure 2.

This swivel 26 comprises a housing 27 preferably of cylindrical form and closed at its upper and lower ends by heads 28 and 29 respectively, the former of which is preferably removable but adapted to be securely retained in substantially dust proof relation upon the housing 27 as by a plurality of screws 31. A bail 32 is affixed to the housing 27 and extends upwards therefrom, preferably the legs 33 of the bail extending downwards beyond the bottom 29 of the housing 27 and being bent thereunder as at 34 so as to define a structure having the strength necessary to resist the stresses to which it will be subjected when used as contemplated herein.

Within the housing 27 a cup 36 is preferably rigidly secured. This cup provides a seat for an anti-friction thrust bearing 37 comprising upper and lower races 38 and 39 respectively, the latter of which fits snugly within the cup 36 so as to be affixed therein. The upper race 38, however, is free to rotate within the cup 36; and a plurality of balls 41 are interposed between the races 38 and 39 so as to permit substantially frictionless rotary motion of the race 38 with respect to the fixed race 39. A shaft 42 is disposed axially of the housing 27 and extends through the lower head or end 29 to receive a thrust collar 43 which is affixed thereto as by a set screw 44, and a clevis or other suitable bail 46. Preferably the upper end of the shaft 42 is provided with a head or enlarged flange 47 which prevents the shaft from being pulled axially through the race 38 into which it is preferably shrink- or press-fitted. I prefer to provide a set screw 48 threaded through the upper dust cover 28, in position to bear against the end of the shaft 42 exactly at its axis of rotation and thereby regulate the amount of end play or thrust permitted the shaft 42.

The tight fit established between the upper cover 28 and the housing 27 makes it possible to exclude practically all dust from the anti-friction bearing 37 and to retain a suitable lubricant within the housing. Toward these same ends, I prefer to provide a dust washer 51 of felt or analogous material interposed between the bottom 29 of the housing 27 and the bottom of the bearing cup 36, this washer having an axial aperture which is large enough to receive the shaft 42 so as to permit practically free rotation of the shaft 42, but adapted to prevent all dust from entering the housing alongside the shaft, and to retain lubricant within the housing.

The method of application of the swivel 26 to the tackle, is clearly illustrated on Figure 1. It is incorporated into and made a portion of the standing part 9, of the line 11, by attaching the extreme end of the standing part 9 to the bail 32 and by securing the clevis 46 within the bail 52 which is provided at the heel or inner end of the block 8. When so positioned, the swivel 26 serves as a portion of the standing part 9, taking whatever tensional stress may be imposed thereon and yet permitting practically unrestricted rotary movement thereof with respect to the block 8 whereby the standing part 9 can free itself of twists and kinks which would otherwise tend to collect in the standing part during normal use of the tackle.

I claim:

A swiveled clevis for fastening the standing part of the line of a block and tackle to one of the blocks, comprising a housing having a lower head and a removable upper head, a bearing cup within said housing, an anti-friction bearing within said cup and comprising a lower race, an upper race freely revoluble with respect thereto, and anti-friction means interposed between said races, a shaft affixed to said upper race and extending revolubly through said lower race, cup, and lower head, a dust-tight and grease-tight washer interposed between said cup and lower head, means for fastening said upper head upon said housing in dust-tight and grease-tight relation thereto, a screw threaded through said upper head and engaging the end of said shaft to limit longitudinal movement thereof, and fastening means on said shaft and on said housing for securing them to said line and block.

CLAUS OTTE.